July 23, 1963  D. BISHOP ET AL  3,098,622
TAPE-MEASURES

Filed Nov. 21, 1961  7 Sheets-Sheet 4

United States Patent Office 3,098,622
Patented July 23, 1963

3,098,622
TAPE-MEASURES
Donald Bishop, St. Albans, and Jonathan Heath Ripper, Barnhurst, Kent, England, assignors to National Research Development Corporation, London, England, a British corporation
Filed Nov. 21, 1961, Ser. No. 154,012.
19 Claims. (Cl. 242—84.8)

This invention relates to tape-measures and has for an object to provide a tape-measure which can be used over relatively long distances in unsupported spans.

The present application is a continuation-in-part of our application Serial No. 31,890, filed May 26, 1960.

In this specification the term "tape-measure" is deemed to define that kind of measure in which a graduated tape is normally stored on a reel or drum in a hand casing.

When the distance between, say, two horizontally spaced points in a structure is measured by means of a conventional surveyor's tape-measure and it is not practicable to lay the tape along a flat surface, the actual distance measured by the tape is not a straight line but a catenary whose length of arc is a function of the tension in the tape. The reading of the tape is therefore in excess of the actual distance between the two points and a correction has to be applied. Even if heavy tension is applied to the tape, significant errors arise over relatively long spans, and these errors vary with the value of the tension applied.

Attempts to eliminate these errors are sometimes made by applying a known tension to the tape by external means—such as a spring balance connected to the free end of the tape—but this procedure requires at least two operators one of whom checks the reading of the spring balance and signals the instant of correct tension at which the other operator must read the tape. This not only gives rise to significant errors, but is also cumbersome and time-consuming, and it is accordingly an object of the present invention to provide a form of tape-measure which is not subject to the above-mentioned disadvantages.

This is achieved by providing in the tape container or case a restraint of known fixed value acting on the tape reel which is adapted to apply constant tension to the tape when extended.

Preferably, the restraint is applied by a clutch so as to be operative to produce a constant tension in the tape at least over the final portion of the unreeling of the tape to measure the required span.

Advantageously the restraint is provided by one or more spring strips or bands each of which is adapted to be uncoiled onto a common restraint bobbin in the reverse sense. This action of winding the spring strips or bands onto the bobbin in the reverse sense from that in which they are normally wound provides a substantially constant torque over the full rotation of the restraint bobbin.

In the above arrangement, when the clutch is released preparatory to rewinding or reeling in of the tape, there is a considerable tendency for the spring tensioning bands to fly back, and this can cause damage to the springs and their bobbin anchorages and to the casing of the measuring tape. Accordingly, the present invention may further provide a damper, preferably hydraulic, which exerts an opposing torque on the restraint bobbin when the latter is running free under the action of the restraint springs alone, thereby controlling the rate of rewind of the latter at a value at which damage will not arise.

Each spring band may be anchored at one end to the aforesaid bobbin and at the other end to a spool mounted on the casing of the tape measure, the bobbin being adapted to be connected to the tape reel by a manually operable clutch. A damper may also be mounted on the casing.

Alternatively the spools may be mounted on the tape reel. By mounting the spools on the tape reel instead of on the casing, the casing may be of lighter weight and the strength concentrated in the tape reel. Thereby the overall weight of the tape measure can be decreased. The damper, when provided, may also be mounted on the tape reel, thus reducing the strength required in the casing.

The damper may have a shaft which moves backwards and forwards through a wall of the damper housing under the action of a screw-threaded connection outside the housing. However, satisfactory lubrication of the connection is difficult and this difficulty may be avoided by employing a construction of damper comprising a fluid-tight container fixed to the tape reel, within which container is reciprocable a leaky piston having a one-way pressure relief valve, said piston being non-rotatably mounted in screw-threaded engagement on a threaded portion of a spindle, which spindle extends outside the container and is there connected to rotate with the restraint bobbin.

Practical embodiments of the invention will now be particularly described with reference to the accompanying drawings in which.

Figure 1:
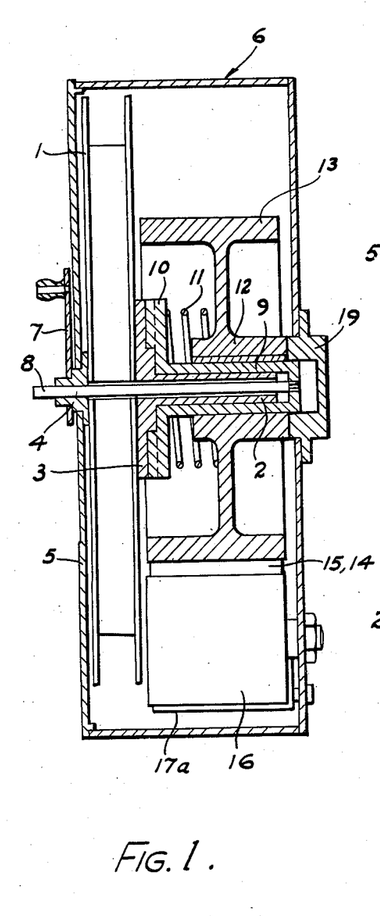
FIGURE 1 is a section on the line I—I of FIGURE 2 showing a first embodiment.
Figure 2:
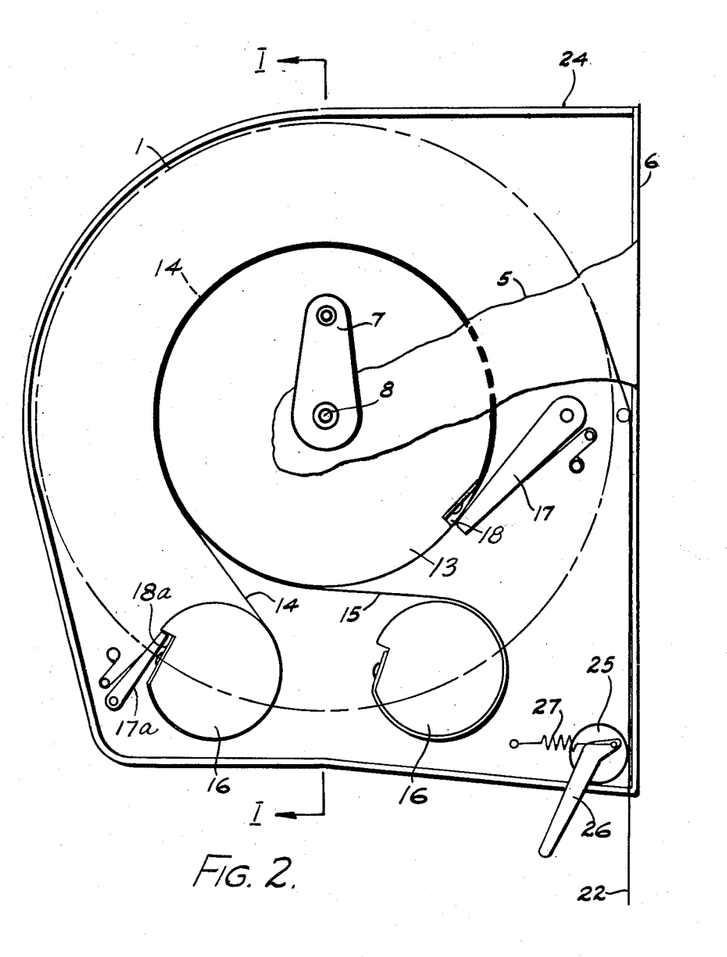
FIGURE 2 is a front elevation of FIGURE 1.
Figure 3:
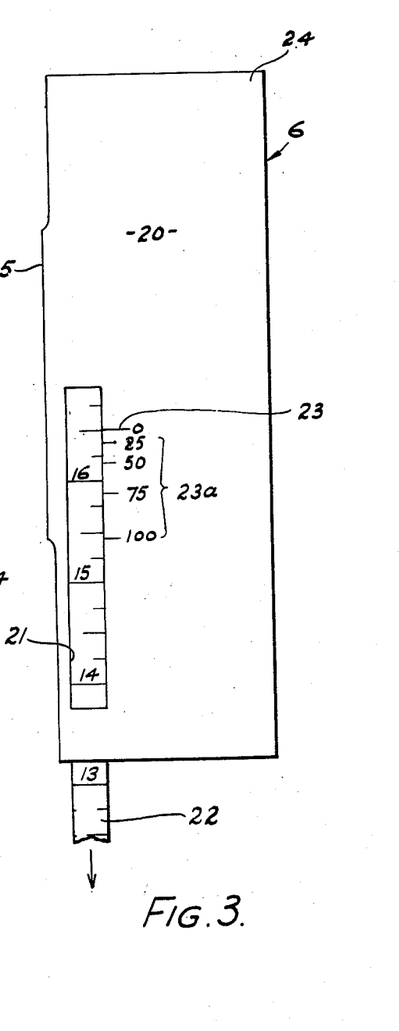
FIGURE 3 is a side elevation of FIGURE 1.
Figures 4, 5:
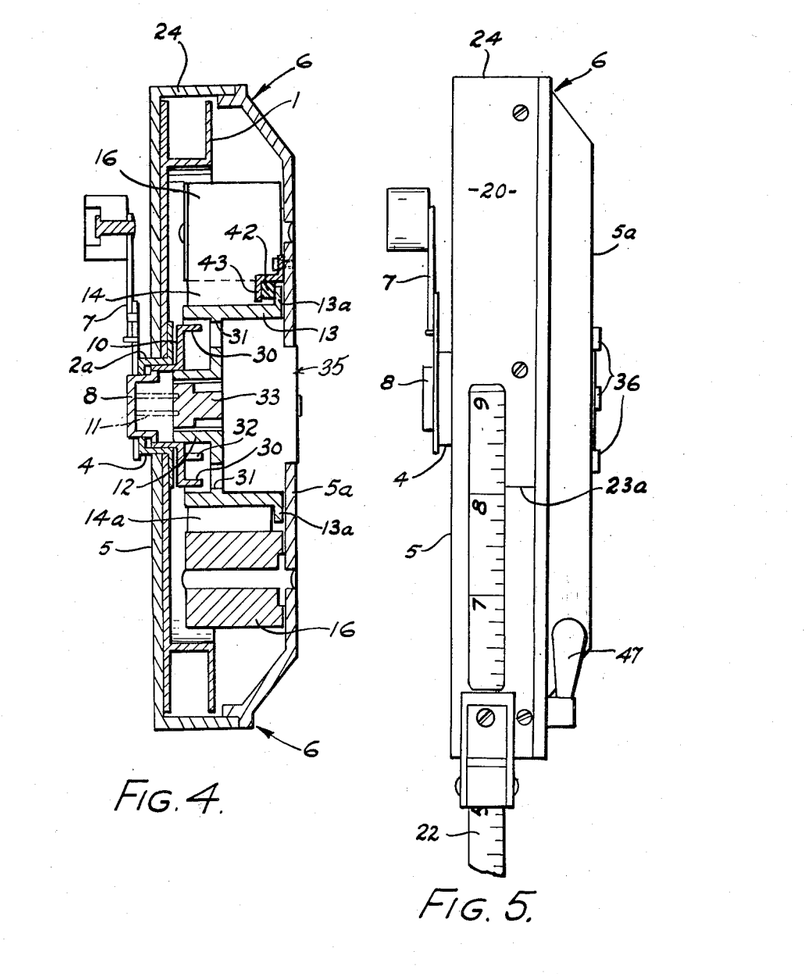
FIGURE 4 is a section on the line IV—IV of FIGURE 7 showing a modified embodiment.
FIGURE 5 is an elevation seen in the same direction as the section of FIGURE 4.

Referring first to FIGURES 1–3, the tape drum or reel 1 is mounted on a flanged hollow shaft 2, one cheek-plate of the reel being riveted to the flange 3 on the shaft. The other cheek-plate carries a stepped co-axial boss 4 which has a bearing in a cover plate 5 forming part of a D-shaped container or casing 6. The boss 4 has a rewind crank 7 keyed thereto and is drilled through axially to allow a clutch disengaging rod or button 8 to slide therethrough and through the shaft 2. The inner end of the rod 8 is anchored in a sleeve 9 which surrounds, and constitutes a bearing for the hollow shaft 2, and at its outer end carries a clutch flange 10 which is normally biased into contact with the inward face of the flange 3 by a helical compression spring 11. The mutually opposed faces of both flanges 3, 10 are radially toothed to constitute the components of a dog-clutch. The inner end of the sleeve 9 is closed and rests in a bearing cup 19 on the casing 6.

The sleeve 9 is slidable in but keyed to the hub 12 of a restraint bobbin 13 to the circumference of which are anchored two spring tensioning strips or bands 14, 15 which are normally accommodated on spools 16. The arrangement is such that the tensioning bands 14, 15 tend to wind themselves onto the spools 16, 16 and the action of unwinding them, with reverse bending, onto the restraint bobbin 13 produces a substantially constant opposing torque throughout the length of the bands. A spring-loaded pawl 17 bears against the tensioning bands on the circumference of the restraint bobbin 13 and engages a notch 18 in the circumferential wall of the bobbin at the point of anchorage of one of the bands to prevent complete winding of the tensioning bands from the bobbin 13, whilst a similar pawl 17a provides a similar automatic stop on one spool 16 in the opposite direction of wind by engaging notch 18a.

The restraint bobbin 13 is clutched to the tape drum or reel 1 through the sleeve 9 and clutch components 10, 3 by the action of the helical compression spring 11.

The straight wall 20 of the container or casing 6 has a window 21 formed therein through which the tape 22 is visible as it unwinds from the reel. Alongside this window is fixed or engraved a zero reading mark 23 and a short catenary scale 23a showing correction graduations for intervals of true length (such as 25 ft., 50 ft., 75 ft., and 100 ft.) against which the tape can be read in order to correct for the caternary error. The tape 22 itself is calibrated in a linear scale commencing at the value (approximately 6 inches) of the length of the wall 20, since internal measurements will be made from the end 24 of this wall which constitutes the measuring plane of the tape.

A tape lock consisting of an eccentric roller 25 keyed on the spindle of a lever 26 biased by an over-centre spring 27 allows the tape to be clamped after it has been run out to measure a span so that a reading can be taken after the tension in the tape has been relieved.

In use, the tape 22 is run out with the clutch button 8 depressed to release the clutch 3, 10. When the tape has reached within, say, 5 or 6 feet of the span, the clutch button is released, and further unreeling of the tape 22 winds the tensioning bands 14, 15 onto the restraint bobbin 13. Constant tension is thus applied to the tape 22 to give a standard sag over any span. To reel in the tape, the clutch button 8 is again depressed, and the restraint bobbin 13 is free to rotate under the action of the inherent resilience of the tensioning bands 14, 15 until arrested by the pawl 17. Meanwhile, the tape drum or reel 1 is free to be rotated by the crank 7.

In order to prevent over-stressing of the tensioning bands 14, 15 and the pawl 17a if the clutch 3, 10 is engaged prematurely during unreeling of the tape 22, resulting in an attempt to unwind the bands too far, the teeth on the clutch elements 3, 10 may have sloping flanks so that on overload they tend to disengage against the action of the spring 11. The tension required to cause this overrun of the clutch 3, 10 is sensibly greater than that required for unwinding the bands 14, 15 from their spools 16, and the clicking of the overrunning clutch teeth gives audible warning of the occurrence of this excess tension, so that the user can depress the clutch button and release it again to reset the constant restraint and restore the correct tension to give the standard sag of the tape 22 over the span.

Referring now to FIGURES 4–7 of the drawings, the tape drum or reel 1 is mounted on a thimble 2a which projects through the front plate 5 of the casing 6 and has secured thereto a rewind crank 7 of conventional hinged construction. The dome of the thimble 2a is pierced by a hole through which projects a button 8 for controlling the engagement and disengagement of a dog-clutch plate 10 with a restraint bobbin 13. The clutch plate 10 has a series of lugs 30 which can engage in holes 31 in the web of the bobbin 13, the plate 10 being keyed to the tape drum 1 by means of studs 32 projecting inwards from the drum. A helical compression spring 11 holds the clutch out of engagement until the button 8 is depressed. The button is held in the depressed position by the end of the rewind crank 7 when the latter is hinged back on itself—as when the tape 22 is being run out.

The boss 12 of the bobbin 13 is internally threaded, the thread being engaged by the head 33 of a shaft 34 (FIG. 6) of an hydraulic damper unit 35 which is mounted in the cavity within the bobbin 13. The damper unit consists of a cylindrical fluid-tight box secured on the back cover 5a of the casing 6 by means of screws 36. Within the box is located a leaky piston or vane 37 of a diameter slightly less than that of the box and which is prevented from rotating by guide pillars 38 passing through clearance holes in the vane 37 near the periphery thereof. The vane is fixed on the shaft 34, which enters the damper box through a synthetic resin plastic sealing bush 39, and has bleed holes 40 drilled through it close to the shaft 34. The outer ends of these bleed holes are normally sealed by a flap valve consisting of a flexible washer 41 which is captive on the shaft 34. The box 35 is filled with oil, and the vane 37 can be displaced to the left in FIGURE 6 with little resistance due to the lifting of the flap valve 41 by oil pressure in the bleed holes 40. The "hand" of the screw thread in the bobbin boss 12 is selected so that this displacement occurs when the tape 22 is being unreeled from the drum 1 while the clutch 10 is engaged with the bobbin 13 by depression of the button 8.

Figure 6:
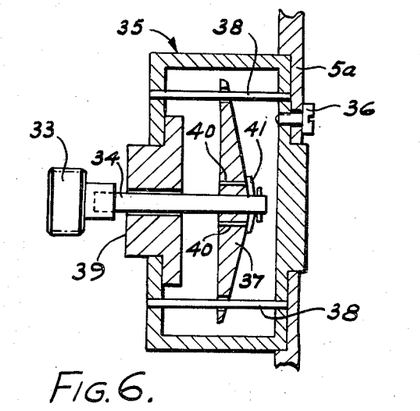
FIGURE 6 is an enlarged sectional view of the damper in FIGURE 4.
Figure 7:
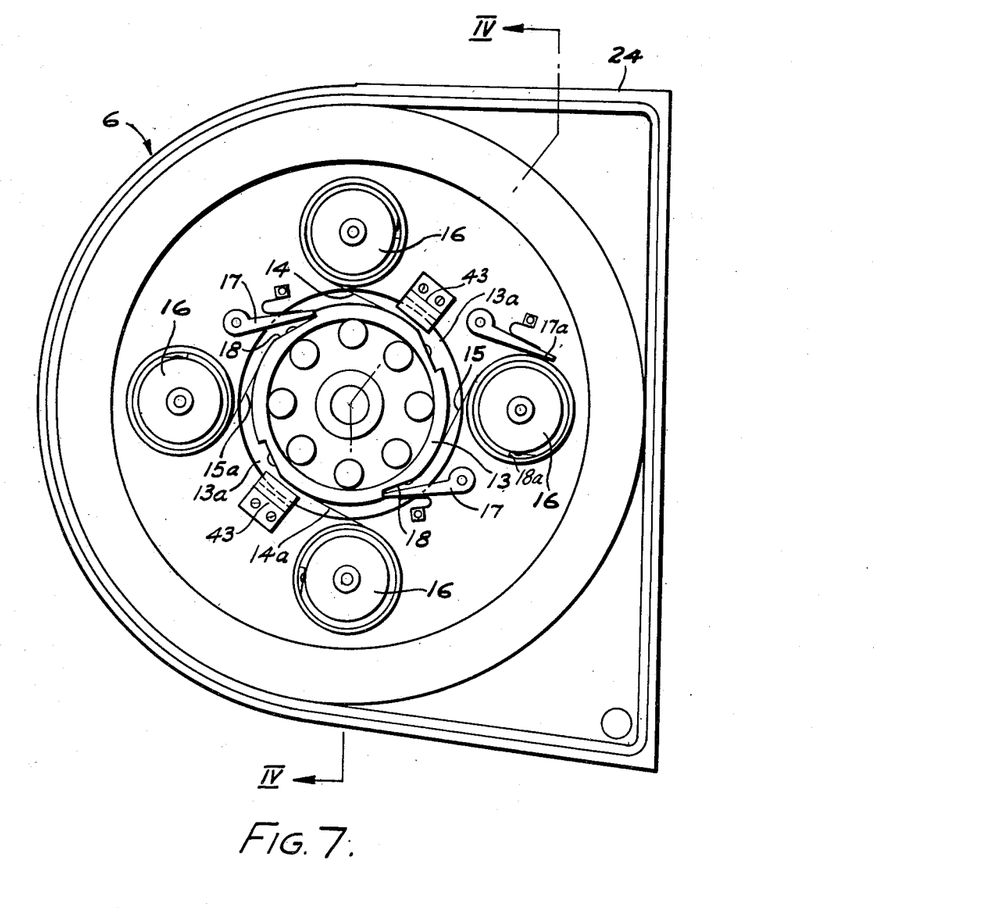
FIGURE 7 is a view of the restraint mechanism in the tape case with the front cover thereof removed.

When the clutch button 8 is release to disengage the clutch 10, the bobbin 13 is rotated in the opposite direction by the tensioning springs 14, 14a, 15, 15a, but its speed of rotation is now limited by the speed at which oil can be displaced around the periphery of the vane 37, the oil pressure to the right of the vane in FIGURE 6 serving to press the flap valve 41 against the vane and close the bleed holes 40.

If the vane 37 is a slack fit between abutment collars on the shaft 34 instead of being rigidly secured thereto, the bleed holes 40 can be dispensed with, oil passing from left to right in FIGURE 6 through the clearance around the shaft where it passes through the vane 37.

The pressure generated in the oil of the damper unit 35 produces an axial thrust on the restraint bobbin 13 which tends to force it into contact with the tape reel 1. In order to avoid this, the bobbin 13 is held against axial displacement by means of a flange 13a which is engaged by diametrically opposed bearing pads 42, preferably by a self-lubricating or low-friction material such as carbon or polytetrafluoroethylene, which are secured on the back wall 5a of the casing 6 by stout brackets 43.

Figure 8:
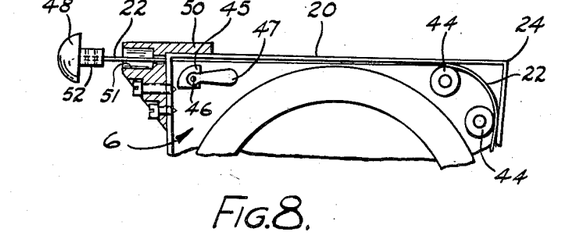
FIGURES 8 and 9 are fragmentary views illustrating detail modifications.

FIGURE 8 illustrates a modification of the tape feed which ensures greater constancy of tension when the tape 22 is being unreeled against the tensioning springs 14, 14a, 15, 15a. This consists of a pair of additional guide rollers at 44 mounted on the front plate 5 close to the internal angle between the straight edge 20 and the measuring plane 24. One roller 44 is located close to the inner surface of the straight edge 20 so that the tape lies very close to this surface for the greater part of the length of the edge, but is not pressed into frictional contact therewith. The guide rollers 44 reduce the friction of unreeling of the tape 22 against the tensioning springs.

This figure also shows an alternative construction of the tape lock. This consists of a cam 45 formed by a 90° sector of a circle and fixed on a stub shaft 46 at a point which is offset from the true centre of the sector in a direction towards the straight edge 20. A finger piece 47 is fixed on the shaft 46 outside the casing 6. As the cam 45 is rotated clockwise in FIGURE 8, it wedges the tape 22 against the internal surface of the edge 20.

Figure 9:
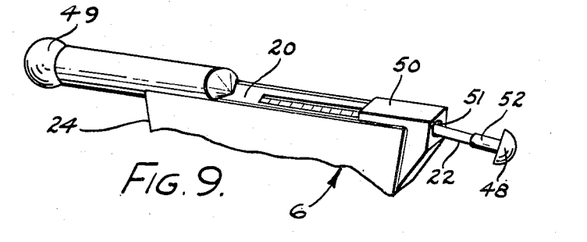

In the modification shown in FIGURE 9, the tape 22 is provided with a hemispherical knob or mushroom head 48 on its free end. When measuring into an internal angle with such a knob, a correction must be applied which will be a function of the radius of the sphere. A similar hemispherical knob may be attached to the casing 6, as shown at 49, the dimensions of this attachment being chosen so that, in conjunction with the tape knob 48, measurements can be made between internal corners bounded by three planes—as in a room—with a standard correction for the reading of the tape against the register mark 23 on the straight edge 20 of the casing. Alternatively, a second register mark may be provided against which the graduations on the tape may be read direct when the hemispherical knobs 48, 49 are in use.

FIGURES 8 and 9 also illustrate a form of "keep" or steady 50 which is fixed to the casing 6 around the tape aperture. This steady has a socket 51 into which a shank portion 52 of the hemispherical knob 48 is a close fit when the tape 22 is fully reeled in. The socket 51 thus provides mechanical support for the hemisphere 48 and prevents kinking of the tape due to accidental knocking of the knob.

Any convenient form of restraint for imparting constant tension to the tape 22 may be adopted according to preference. It may, if desired, act continuously on the tape instead of being clutched thereto at some point during the running out of the tape. Alternatively again, the rewind crank 7 may be connected to the tape reel 1 by a constant-torque drive or coupling, the tape being run out free between the two points and the excess then reeled in until the rewind crank slips at the predetermined value of tension. The tape is then read against the catenary scale.

Figure 10:
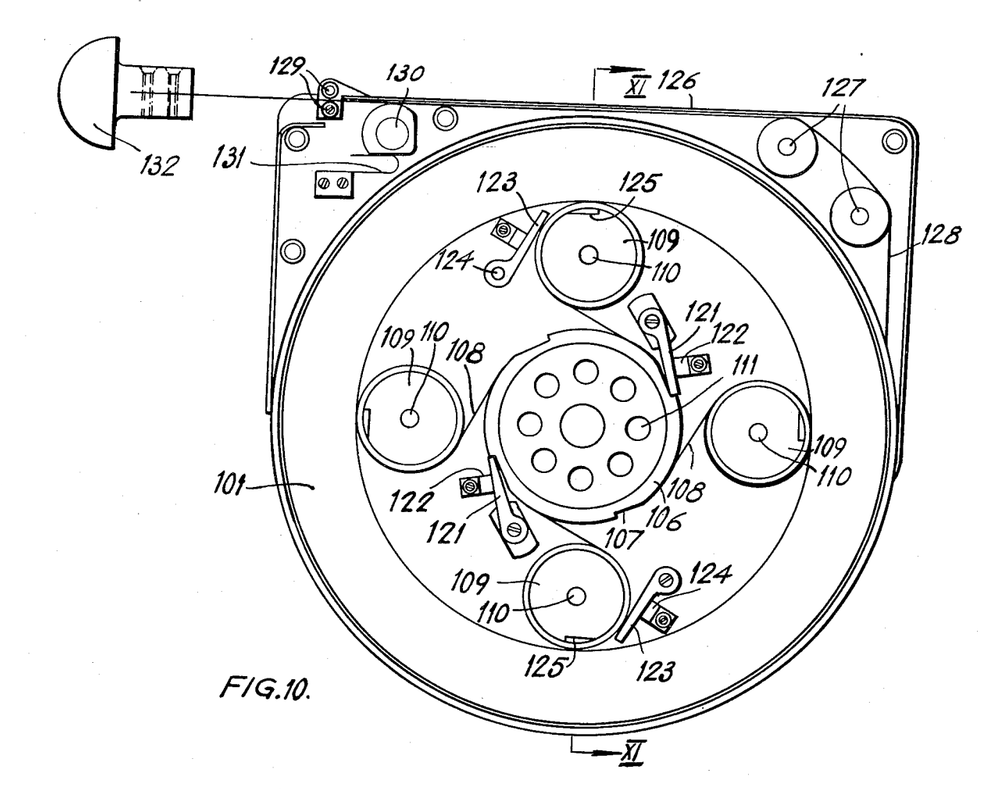
FIGURE 10 is a view of a modified construction of tape measure with a side cover removed.
Figure 11:
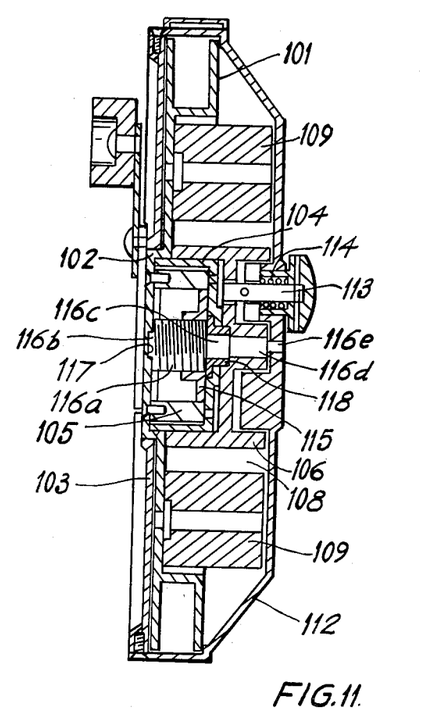
FIGURE 11 is a sectional view on the line XI—XI of FIGURE 10 with said side cover in position.
Figure 12:
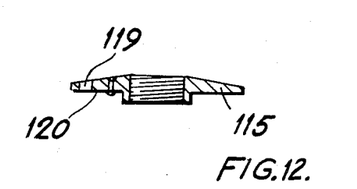
FIGURE 12 is a sectional view of a detail of the construction shown in FIGURES 10 and 11.

FIGURES 10-12 illustrate a modified construction in accordance with the present invention in which the spools and the damper are mounted on the tape drum instead of on the casing. Referring to FIGURES 10-12, the tape drum or reel 101 has a central dished portion 102 which projects through and is journalled in a side wall or cover 103 of the casing. A conventional hinged re-wind handle outside the side wall is secured to the dished portion 102. Fixed to the tape reel 101 within the central dished portion 102 is a cylindrical damper housing 104, which is secured to the tape reel by retaining pins 105. Journalled on the damper housing 104 is a restraint bobbin 106. On its circumference the restraint bobbin 106 has four equally-spaced notches 107 in each of which is secured, by counter-sunk screws, one end of a spring band 108 which is normally coiled on a spool 109 which is rotatable on a spindle 110 fixed to the tape reel 101. The bobbin has a ring of locking holes 111 and a side wall or casing 112 of the casing carries a manually operable locking pin 113 which is normally urged clear of said holes by a spring 114. The locking pin 113 can be pressed inwardly to engage in a locking hole 111 and retained in position by a radial projection on the pin which engages behind an abutment surface on the casing 112. The damper housing 104 is filled with oil and contains a circular piston 115 which is of slightly smaller diameter than the internal diameter of the housing. The piston 115 is reciprocable within the housing, sliding along the retaining pins 105 which pass through holes in the piston. The piston is in screw-threaded engagement in the housing with a threaded portion 116a of a spindle having a reduced portion 116b at one end which is journalled in a shallow recess 117 in the tape reel 101. A stepped portion 116c of the spindle is fitted with a seal 118 to prevent leakage of oil from the damper housing. Beyond the seal 118 outside the housing 104 the spindle is squared at 116d and fits into a square hole in the restraint bobbin 106. End portion 116e of the spindle is journalled in the cover 112. The piston 115 is provided with a fluid passage-way 119 normally closed by a small, very weak, leaf spring 120 as shown in FIGURE 12.

In use the graduated tape, which is anchored to the tape reel, is unwound, with accompanying rotation of the tape reel, for nearly the required distance. The locking pin 113 is then depressed to engage in one of the holes 111 and lock the restraint bobbin 106 against rotation. Consequently, continued unwinding of the tape for the rest of the required distance causes unwinding of the spring bands 108 on the restraint bobbin. Thereby a constant torque is applied to the tape reel and a constant tension is applied to the tape. During this period the damper piston 115 moves to the right, as seen in FIGURE 2, without offering appreciable resistance owing to the passage of fluid through the passage-way 119. When the locking pin 113 is released to permit rewinding of the tape, the spring bands rewind themselves on to their spools 109. The rate at which they do so is restricted by the speed of rotation of the restraint bobbin 106 and in turn the speed of rotation of the bobbin is limited by the action of the damper piston 115. Thus undesirably fast rewinding of the spring bands and resulting damage to the tape measure is avoided. It will be noted that all of the forces resulting from use of the spring bands and the damper are taken by the tape reel 101 and not by the casing.

In order to avoid winding the spring bands too far off the restraint bobbin 106 or the spools 109, with resulting damage to the bands or their anchorages, pawls 121 are provided urged by U-springs 122 against the restraint bobbin 106 and pawls 123 are urged by U-springs 124 against two of the spools 109. The pawls 121 are engageable in the notches 107 of the restraint bobbin to prevent further rotation thereof when the spring bands have been almost completely unwound therefrom. When the spring bands are being wound on to the bobbin the pawls 121 ride smoothly over the surface of the bands and rotation can continue until the bands are unwound from their spools to such an extent that the pawls 123 engage in notches 125 in the spools. Premature engagement of pawls in the notches is impossible since the pawls ride on the spring bands until they are almost unwound.

It will be appreciated that the damper is still effective if the locking pin 113 is not released before starting to rewind the measuring tape. However in that case only a very limited length of tape can be rewound before the pawls 121 engage in the notches 107 in the restraint bobbin and it is then necessary to release the locking pin.

It may sometimes be that the locking pin 113 is depressed too soon, and in that case the pawls 123 will engage in the notches 125 and prevent further unwinding of the graduated tape. It is then necessary to release the locking pin and thus allow the spring bands and damper piston to return to their initial positions. The locking pin is then again depressed and unwinding of the graduated tape is completed.

A separate housing 126 having a semi-circular recess may be screwed in position on the tape measure casing. The housing 126 has two interior guide rolls 127 for the tape 128, which after passing over the guide rollers extends along the long side wall of the housing 126 past a window, where it can be seen by the user. Alongside this window is fixed or engraved a zero reading mark and a short catenary scale showing correction graduations for intervals of true length (such as 25 ft., 50 ft., 75 ft., and 100 ft.) against which the tape can be read in order to correct for the catenary error. The tape 128 itself is calibrated in a linear scale commencing at the value (approximately 6 inches) of the length of said long side wall since internal measurements will be made from the end of this wall which constitutes the measuring plane of the tape. The tape has a hemispherial knob 132 on its free end. The tape passes out of the housing 126 between the two rollers 129. The tape may be clamped in an extended position by rotation of a cam member 130 which has an operating knob outside the housing. A U-spring 131 engages a flat on the cam member 130 to hold it in the locked position.

We claim:

1. A tape measure comprising a casing; a tape drum journalled in said casing; a restraint bobbin journalled coaxially with said tape drum; a spool journalled beside said bobbin; a spring band anchored at one end to said spool and at the other end to said bobbin and oppositely wound on said spool and said bobbin; and means for interconnecting said tape drum and said bobbin.

2. A tape measure comprising a casing; a tape drum journalled in said casing; a restraint bobbin journalled coaxially with said tape drum; a spool journalled beside said bobbin; a spring band anchored at one end to said spool and at the other end to said bobbin; and manually operable clutch means for interconnecting said tape drum and said bobbin at will.

3. A tape measure comprising a casing; a tape drum journalled in said casing; a restraint bobbin journalled coaxially with said tape drum; a plurality of spools disposed around said bobbin; a spring band anchored to each spool and to said bobbin so as to be wound in one direction on the spool and in the other direction on the bobbin; and clutch means for selectively engaging and disengaging said tape drum and said bobbin.

4. A tape measure comprising a casing; a tape drum journalled in said casing; a restraint bobbin journalled coaxially with said tape drum; a plurality of spools disposed around said bobbin; a spring band anchored to each spool and to said bobbin so as to be wound in one direction on the spool and in the other direction on the bobbin; a notch in the circumference of a spool at the anchorage of the respective spring band thereto; a pawl pivoted in said casing and engageable in said notch; and clutch means for selectively engaging and disengaging said tape drum and said bobbin.

5. A tape measure comprising a casing; a tape drum journalled in said casing; a restraint bobbin journalled coaxially with said tape drum; a plurality of spools disposed around said bobbin; a spring band anchored to each spool and to said bobbin so as to be wound in one direction on the spool and in the other direction on the bobbin; a notch in the circumference of a spool at the anchorage of the respective spring band thereto; a notch in the circumference of said bobbin at the anchorage of a spring band thereto; pawls pivoted in said casing and engageable with respective notches; and clutch means for selectively engaging and disengaging said tape drum and said bobbin.

6. A tape measure comprising a casing; a tape drum journalled in said casing; a restraint bobbin journalled coaxially with said tape drum; a spool adjacent said bobbin; a spring band anchored at one end to said spool and at the other end to said bobbin so as to be oppositely wound thereon; clutch means for selectively interengaging said tape drum and said bobbin; and a dashpot connected to said restraint bobbin to check its speed of rotation when declutched from said tape drum after at least some of said spring band has been wound thereon.

7. A tape measure according to claim 6 wherein said dashpot comprises a cylinder fixed on said casing within said bobbin, and an axially displaceable non-rotatable vane connected by a screw thread to said bobbin.

8. A tape measure comprising a casing; a tape drum journalled in said casing; a restraint bobbin journalled coaxially with said tape drum; a spool journalled beside said bobbin; a spring band anchored at one end to said spool and at the other end to said tape drum and oppositely wound on said spool and said bobbin; a mushroom head fixed on the free end of the tape, and means for selectively interconnecting said tape drum and said bobbin when the tape is being run out.

9. A tape measure comprising a casing; a tape drum journalled in said casing; a restraint bobbin journalled coaxially with said tape drum; a spool journalled beside said bobbin; a spring band anchored at one end to said spool and at the other end to said tape drum and oppositely wound on said spool and said bobbin; a mushroom head fixed on the free end of the tape; a similar mushroom head secured to said casing and projecting oppositely from the casing to the tape; and means for selectively interconnecting said tape drum and said bobbin when the tape is being run out.

10. A tape measure having means for applying a restraint to the tape drum at least where the tape is run out to approximately the required length, wherein the restraint is constituted by a bobbin having anchored to the circumference thereof one end of a coiled spring metallic band so as to wrap the latter around the circumference in the reverse sense to the natural coiling of the spring band, and wherein a damper is coupled to the restraint bobbin and is operative to reduce the rate of rewind of the spring band.

11. A tape measure according to claim 10 wherein the damper comprises a fluid-tight container within which is reciprocable a leaky piston having a one-way fluid pressure relief valve, the said piston being non-rotatable and coupled to the tape drum by an axial screw thread.

12. A tape measure comprising a casing; a tape drum journalled in said casing; a restraint bobbin journalled coaxially with said tape drum; a spool journalled beside said bobbin; a spring band anchored at one end to said spool and at the other end to said bobbin and oppositely wound on said spool and said bobbin; and means for interconnecting said spool, spring band and bobbin between the casing and the tape drum.

13. A tape measure according to claim 12 wherein said spool is mounted on the casing and manually operable clutch means is provided for connecting the bobbin to the tape drum at will.

14. A tape measure according to claim 12 wherein said spool is mounted on the tape drum and manually operable clutch means is provided for connecting the bobbin to the casing at will.

15. A tape measure comprising a casing; a tape drum journalled in said casing; a restraint bobbin journalled coaxially with said tape drum; a spool journalled on the tape drum beside said bobbin; a spring band anchored at one end to said spool and at the other end to said bobbin and oppositely wound on said spool and said bobbin; and means for interconnecting said casing and said bobbin.

16. A tape measure comprising a casing; a tape drum journalled in said casing; a restraint bobbin journalled coaxially with the tape drum; a plurality of spools disposed around said bobbin and journalled on the tape drum; a spring band anchored to each spool and to said bobbin so as to be wound in one direction on the spool and the other direction on the bobbin; and clutch means for selectively engaging and disengaging said casing and said bobbin.

17. A tape measure comprising a casing; a tape drum journalled in said casing; a restraint bobbin journalled coaxially with the tape drum; a plurality of spools disposed around said bobbin and journalled on the tape drum; a spring band anchored to each spool and to said bobbin so as to be wound in one direction on the spool and in the other direction on the bobbin; a notch in the circumference of a spool at the anchorage of the respective spring band thereto; a notch in the circumference of said bobbin at the anchorage of a spring band thereto; pawls pivoted in said casing and engageable with respective notches; and clutch means for selectively engaging and disengaging said casing and said bobbin.

18. A tape measure comprising a casing; a tape drum journalled in said casing; a restraint bobbin journalled coaxially with the tape drum; a plurality of spools disposed around said bobbin and journalled on the tape drum; a spring band anchored to each spool and to said bobbin so as to be wound in one direction on the spool and in the other direction on the bobbin; clutch means for selectively engaging and disengaging said casing and said bobbin; and a damper mounted on the tape drum and coupled to the restraint bobbin to reduce the rate of rewind of the spring bands on to the spools.

19. A tape measure according to claim 18 wherein said damper comprises a fluid-tight container fixed to the tape drum, a spindle having a threaded portion inside the container, which spindle extends outside the container and is there connected to rotate with the restraint bobbin, a leaky piston reciprocable within said container and non-rotatably mounted in screw-threaded engagement on said threaded portion of the spindle, and a one-way fluid pressure relief valve in said piston.

References Cited in the file of this patent

UNITED STATES PATENTS

| | | |
|---|---|---|
| 877,232 | Rolland | Jan. 21, 1908 |
| 1,953,869 | Sadgebury | Apr. 3, 1934 |
| 2,268,178 | Boisture | Dec. 30, 1941 |